US009908136B2

(12) United States Patent
Holmes

(10) Patent No.: US 9,908,136 B2
(45) Date of Patent: Mar. 6, 2018

(54) SPRINKLER BASE

(71) Applicant: Katco Holdings Pty Ltd, Wangi Wangi (AU)

(72) Inventor: Kathleen Patricia Holmes, Wangi Wangi (AU)

(73) Assignee: Katco Holdings Pty Ltd (AU)

( * ) Notice: Subject to any disclaimer, the term of this patent is extended or adjusted under 35 U.S.C. 154(b) by 4 days.

(21) Appl. No.: 15/031,499

(22) PCT Filed: Oct. 28, 2014

(86) PCT No.: PCT/AU2014/050317
§ 371 (c)(1),
(2) Date: Apr. 22, 2016

(87) PCT Pub. No.: WO2015/061850
PCT Pub. Date: May 7, 2015

(65) Prior Publication Data
US 2016/0263609 A1  Sep. 15, 2016

(30) Foreign Application Priority Data

Oct. 29, 2013 (AU) .................................. 2013904167

(51) Int. Cl.
*B05B 15/06* (2006.01)
*F16L 15/00* (2006.01)
*F16L 27/08* (2006.01)

(52) U.S. Cl.
CPC .......... *B05B 15/063* (2013.01); *B05B 15/065* (2013.01); *F16L 15/006* (2013.01); *F16L 27/08* (2013.01)

(58) Field of Classification Search
CPC .... B05B 15/063; B05B 15/065; F16L 15/006; F16L 27/08
See application file for complete search history.

(56) References Cited

U.S. PATENT DOCUMENTS

| 1,308,371 | A | * | 7/1919 | Roach | A01G 25/09 239/237 |
| 1,873,622 | A | * | 8/1932 | Moran | B05B 1/3415 239/267 |

(Continued)

FOREIGN PATENT DOCUMENTS

WO  2010013243 A1  2/2010

OTHER PUBLICATIONS

International Preliminary Report on Patentability, dated May 3, 2016, PCT International App. No. PCT/AU2014/050317, Katco Holdings Pty Ltd, 4 pgs.

(Continued)

*Primary Examiner* — Arthur O Hall
*Assistant Examiner* — Steven M Cernoch
(74) *Attorney, Agent, or Firm* — Chernoff Vilhauer McClung & Stenzel, LLP

(57) ABSTRACT

A sprinkler base is provided comprising a platform component and a flow component. The flow component may have a tubular body encompassing a flow passage. A fluid inlet and a first fluid outlet may communicate with each other via the flow passage. The first fluid outlet may be arranged to receive a sprinkler head extending perpendicularly to an axis of the tubular body. The platform component may include mounting means to hold the tubular body of the flow component. Restraint means may be provided to retrain the tubular body against rotation about the axis of the tubular body relative to the platform component in one of a plurality of rotational positions.

16 Claims, 5 Drawing Sheets

(56) References Cited

U.S. PATENT DOCUMENTS

| | | | | |
|---|---|---|---|---|
| 1,910,765 A * | 5/1933 | Hanlan | B05B 1/3415 | 239/267 |
| 2,250,525 A * | 7/1941 | Donnellan | B05B 1/265 | 239/280 |
| 2,544,773 A * | 3/1951 | Barham, Sr. | B05B 15/063 | 248/82 |
| 2,545,745 A * | 3/1951 | Newton | B05B 3/16 | 239/227 |
| 2,660,472 A * | 11/1953 | Rice | A01G 25/09 | 239/230 |
| 3,036,780 A * | 5/1962 | Nelson | A01G 25/165 | 137/408 |
| 3,125,112 A * | 3/1964 | Maurice | A01G 25/162 | 137/119.03 |
| 3,377,029 A * | 4/1968 | Montgomery | B05B 1/202 | 239/280 |
| 4,335,852 A * | 6/1982 | Chow | A01G 25/165 | 137/624.12 |
| 4,545,532 A * | 10/1985 | Schanz | B05B 3/044 | 239/242 |
| 4,819,875 A * | 4/1989 | Beal | B05B 3/0454 | 239/230 |
| 4,971,256 A | 11/1990 | Malcolm | | |
| 5,031,838 A | 7/1991 | Vydrzal | | |
| 5,628,458 A * | 5/1997 | Kuo | B05B 1/20 | 239/242 |
| 5,657,928 A * | 8/1997 | Jian | B05B 1/3026 | 239/242 |
| 5,704,549 A * | 1/1998 | Kephart | B05B 3/06 | 239/236 |
| 5,845,850 A * | 12/1998 | Guo | B05B 3/044 | 239/242 |
| 6,263,912 B1 * | 7/2001 | Brown | B05B 15/10 | 137/513.7 |
| 6,360,968 B1 * | 3/2002 | Orrange | A62C 3/0214 | 169/16 |
| 6,824,073 B1 | 11/2004 | Haney | | |
| 7,419,105 B2 * | 9/2008 | Wang | B05B 3/044 | 239/230 |
| 8,210,451 B1 * | 7/2012 | Gooch | A01C 23/042 | 137/268 |
| D702,812 S | 4/2014 | Morgan et al. | | |
| 8,695,902 B2 * | 4/2014 | Mayher | B05B 1/3026 | 239/255 |
| 2007/0262168 A1 * | 11/2007 | Ericksen | A01G 25/06 | 239/200 |
| 2011/0139898 A1 * | 6/2011 | Shih | B05B 15/063 | 239/280.5 |
| 2013/0270363 A1 | 10/2013 | Wang | | |

OTHER PUBLICATIONS

Examiner's Report dated Jul. 14, 2016, New Zealand IP No. 718912, Katco Holdings Pty Ltd., 3 pgs.

* cited by examiner

SPRINKLER BASE

CROSS-REFERENCE TO RELATED APPLICATIONS

This is a national stage application filed under 35 USC 371 based on International Application No. PCT/AU2014/050317, filed Oct. 28, 2014, and claims priority under 35 USC 119 to Australian Patent Application No. 2013904167, filed Oct. 29, 2013.

INTRODUCTION

A sprinkler base is disclosed that may be adjusted for placement on sloping surfaces.

BACKGROUND OF THE INVENTION

Sprinklers that are used in a variety of irrigation applications may opiate with the sprinkler head arranged in a vertical or inverted orientation. Slight variations from vertical may occur without seriously affecting the operation of the sprinkler head or water distribution efficiency. However, larger deviations from vertical may affect operation of a sprinkler. To our knowledge there are currently no manufactured sprinkler bases that have the ability to adjust the sprinkler head to the preferred vertical or near vertical position when the base is placed on a sloping surface.

BRIEF SUMMARY OF THE INVENTION

A sprinkler base is provided comprising a platform component and a flow component. The flow component may have a tubular body encompassing a flow passage. A fluid inlet and a first fluid outlet may communicate with each other via the flow passage. The first fluid outlet may be arranged to receive a sprinkler head extending perpendicularly to an axis of the tubular body. The platform component may include mounting means to hold the tubular body of the flow component. Restraint means may be provided to retrain the tubular body against rotation about the axis of the tubular body relative to the platform component in one of a plurality of rotational positions.

The mounting means may comprise a pair of circumferential members engaging respective ends of the tubular body. The circumferential members may be 'C' shaped and may have a circumferential opening to permit the passage of the first outlet there through when the tubular body is inserted through the circumferential members to be engaged thereby.

The restraint means may comprise the circumferential members and the tubular body having interengaging shaped surfaces. The interengaging shaped surfaces may be toothed surfaces. The teeth on the interengaging toothed surfaces may be spaced at angles of 5-15° about the axis of the tubular body and preferably at angles of 11-12°.

The tubular body may have a second outlet in fluid communication with the inlet and the first outlet via the flow passage. The inlet and second outlet may be at opposite ends of the tubular body and the flow passage, the inlet and second outlet may be co-axial. A filter may be fitted into the flow passage. The filter may have a screening suit ace separating the first outlet from the inlet and second outlet, to screen fluid exiting through the second outlet while allowing fluid to exit the first outlet unscreened.

A flow restriction device may be provided to restrict an opening of the first outlet through which fluid flows.

A bottom surface of the platform component may have two or more elongate members and preferably 3 elongate members connected by a raised bridge. The elongate members may be spaced to conform to valleys of corrugations in a corrugated sheet material. The bridge may be elevated from the elongate members to pass over ridges of the corrugated sheet material. The elongate members may be spaced at centres which are 71-81 mm or a multiple thereof.

DETAILED DESCRIPTION OF THE INVENTION

Figure 1:
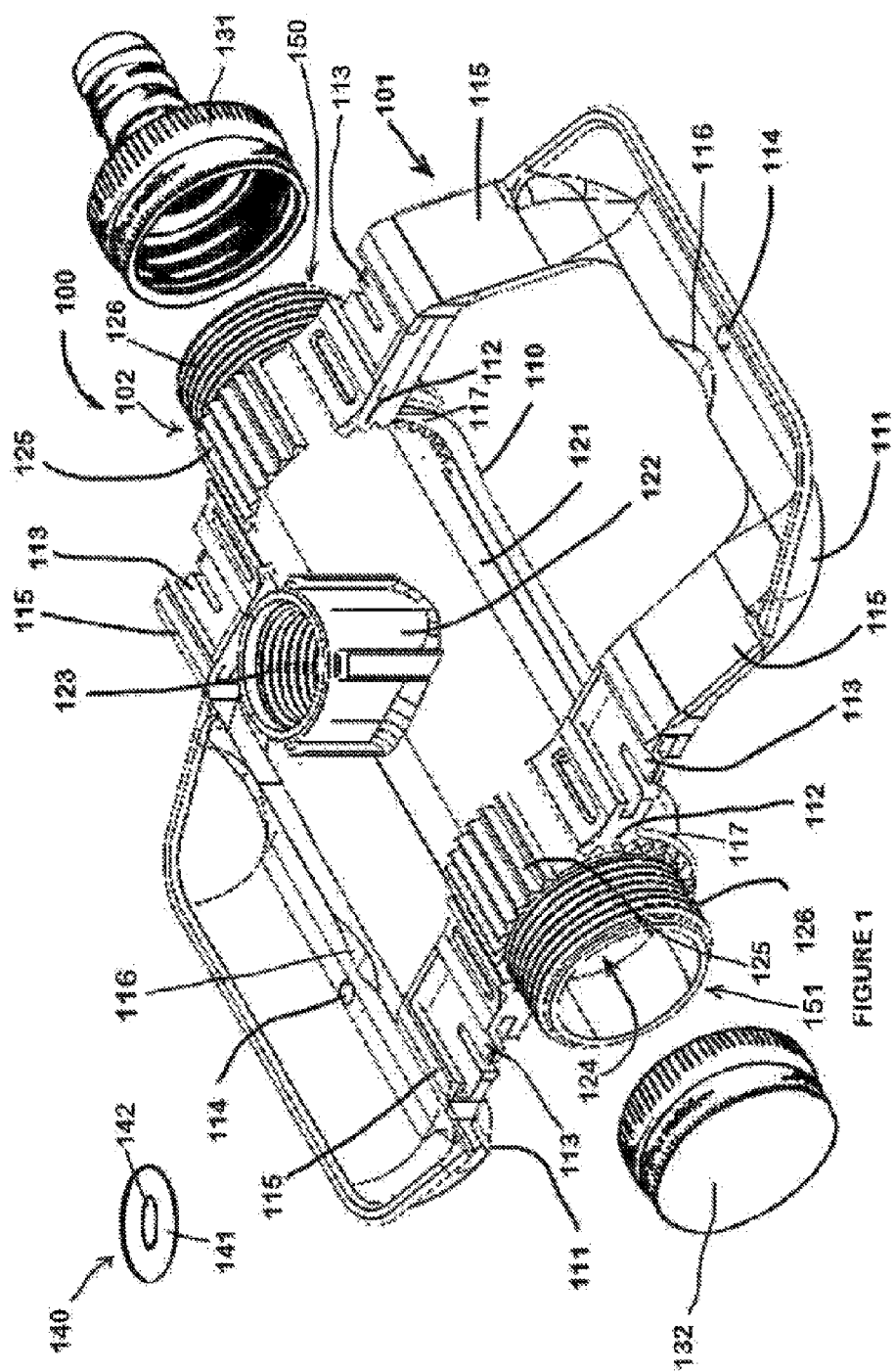
FIG. 1 is a sprinkler base.

Referring to FIG. 1 a sprinkler base 100 is illustrated which comprises a platform 101 and a flow conduit 102, each of which have co-operating parts which allow the platform and flow conduit to inter-engage such that the flow conduit 102 is supported in use in a chosen orientation by the platform 101.

Figure 2:
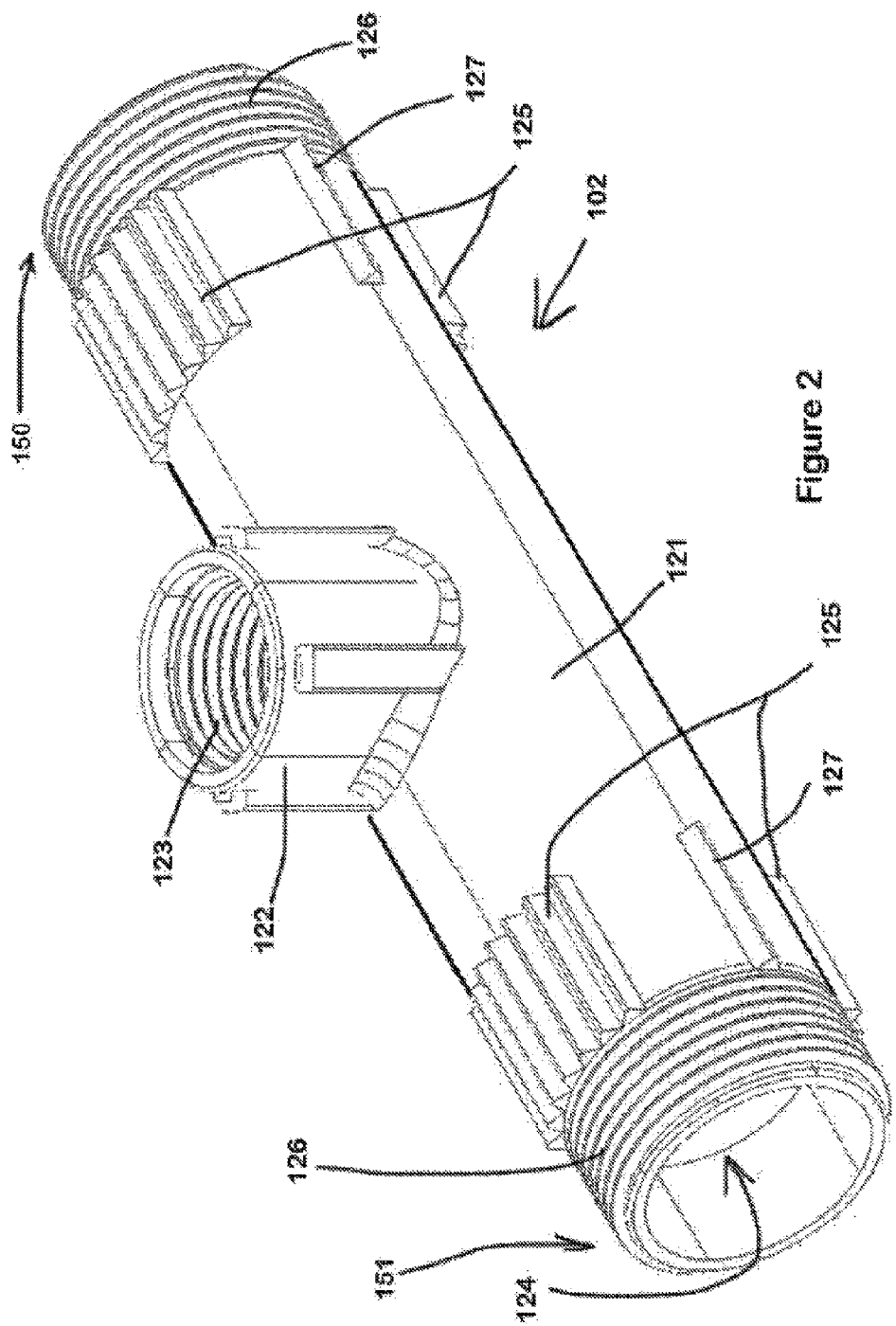
FIG. 2 is a platform.
Figure 3:
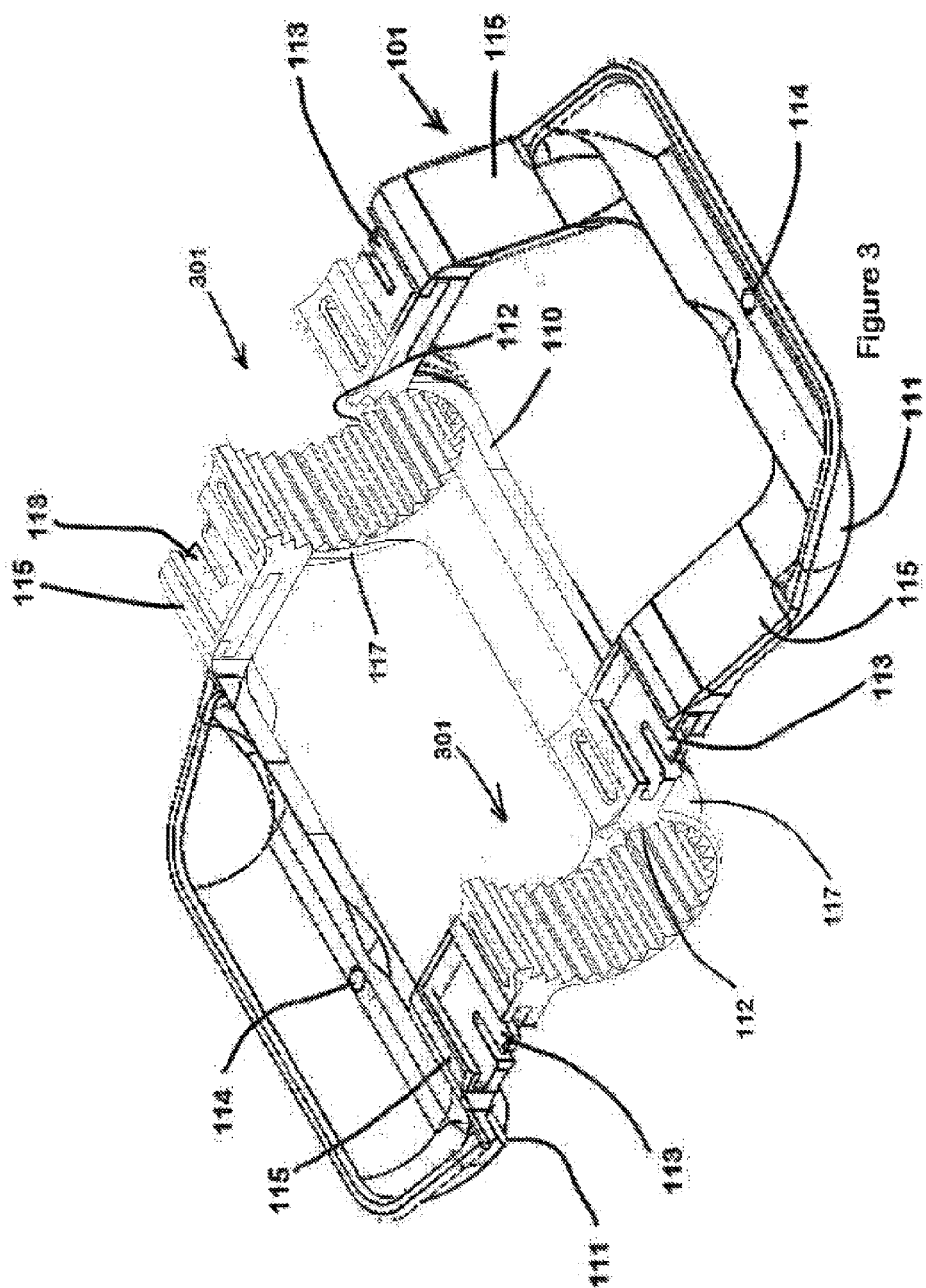
FIG. 3 is a flow conduit
Figure 4:
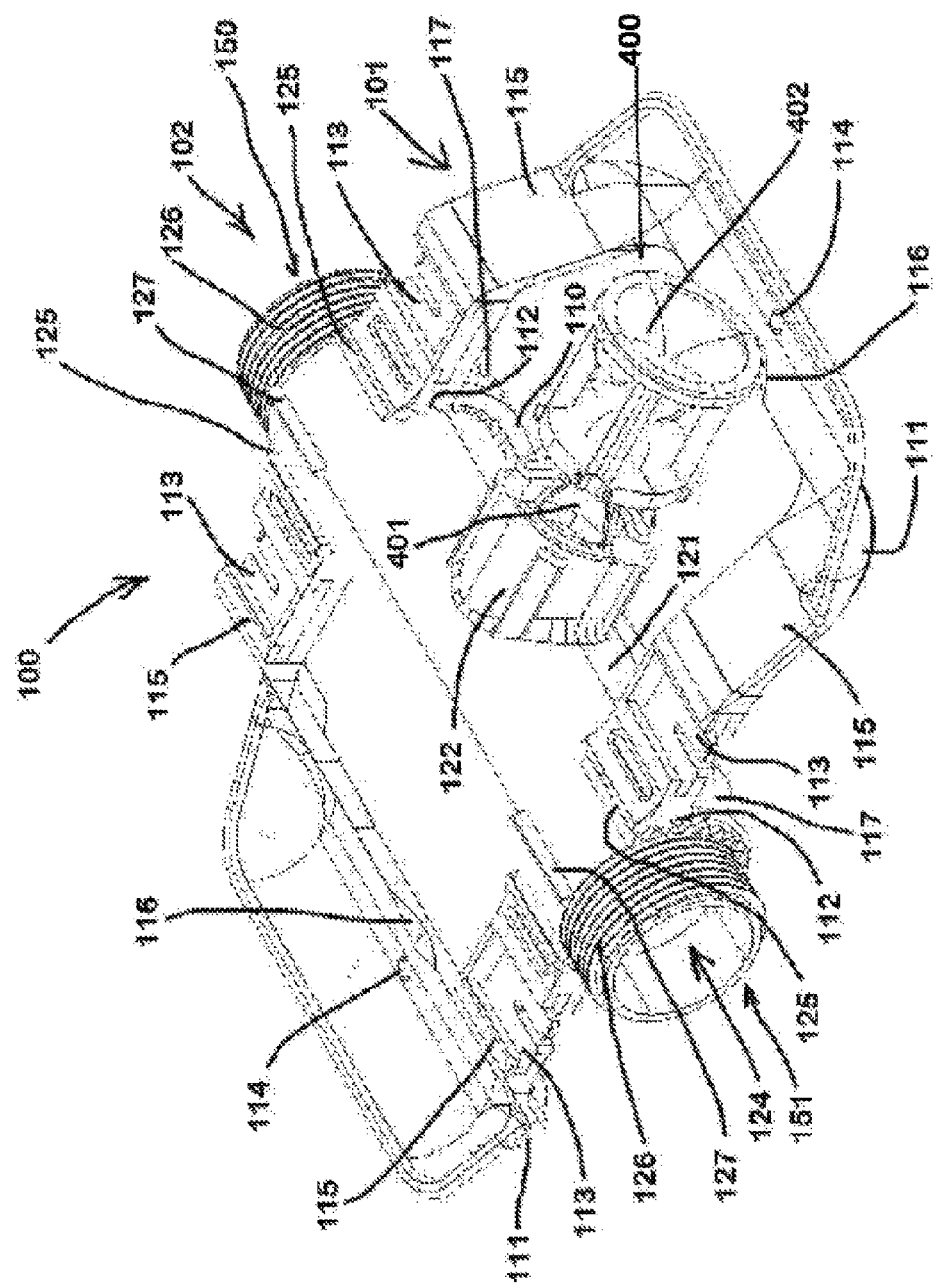
FIG. 4 is a sprinkler head attached to the base.

FIGS. 2 & 3 separately illustrate the platform 101 and the flow conduit 102. The platform 101 is configured with a central channel 110 and two 'skids' 111 positioned either side of the central channel and connected to the central channel by arms 115. The flow conduit 102 comprises a tubular body 121, which is locatable within the central channel 110 for lateral support. The tubular body 121 is terminated at either end by threaded ends 126, the diameter and thread of the threaded ends being selected to match common hose fitting components. The illustrated sprinkler base shows the central body component having 25 mm diameter male threads at each end. This allows commonly available end caps and snap-on hose connection fittings to be connected to the tubular body 121. The tubular body 121 also includes a turret 122 having an internal thread 123 sized to accommodate fittings such as sprinkler heads (400 in FIG. 4 illustrated by way of example—different sprinkler heads may also be used in the present base). The raised turret 122 in the illustrated tubular body 121 is provided with a 15 mm diameter female threaded socket for attachment of a sprinkler head. There is a large range of sprinkler heads available having a 15 mm male thread that will be suitable for use with this sprinkler base design. The illustrated platform 101 has dimensions which are adequate in width and length to support most 15 mm male threaded sprinkler heads.

The tubular body 121 will typically be fitted with a snap-on hose fitting 131 at an inlet end 150 to allow connection to a hose and a cap 132 to close the tubular body 121 at the other end 151 (hereinafter referred to as the outlet end). However fittings can be cascaded by replacing the end cap 132 on the outlet end 151 with a second snap-on fitting 131 (not shown), which allows connection of a second hose connected to a further sprinkler fitting. In this way any number of fittings may be daisy-chained together (subject to limitations of supply pressure).

Landscape surfaces that are subject to irrigation, including domestic gardens, can vary greatly in slope. While many gardens have substantially horizontal surfaces there are many that have significant slopes. Spray irrigation will become ineffective for extremely sloping surfaces, but may be effective for surfaces having angles of up to in the order of 45° from the horizontal.

The sprinkler base 100 illustrated in FIG. 1 permits compensation for the common range of surface slopes, and is capable of correctional adjustments spanning a least the range from 0° to 45° either left or right about an axis passing through the attachment point of the incoming water supply. The minimum incremental adjustment is small enough to enable the sprinkler head 400 attached to the base (see FIG. 4) to be adjusted to an axial orientation at or near vertical when the base is placed on a sloping surface. The illustrated sprinkler head is of the type having a spout 401 and a wobbling spray deflector 402. In the illustrated embodiment the increment of adjustment is 11.25°, permitting the sprinkler head to be adjusted to within +/−5.625 off the vertical. Smaller angles of correction can be made by simply rotating the sprinkler base on the sloping surface to achieve a reduced deviation from the desired vertical orientation of the sprinkler head at the expense of a small deviation from vertical in the direction perpendicular to the fall line of the slope.

The tubular body 121 has outwardly facing circumferential teeth 125 at either end, adjacent to the threaded ends 126, which engage with corresponding inwardly facing teeth 112 on 'C' shaped mounts 117 at either end of the platform 101 allowing the platform 101 and flow conduit 102 to inter-engage, preventing rotation of the flow conduit 102 about its axis relative to the platform 101. The teeth 112, 125 are shown as triangular teeth in the drawings, but other shapes such as square, sinusoidal, circular etc. will be equally effective. Assembly is achieved by inserting the flow conduit 102 through the 'C' shaped mounts 117 with the turret 122 passing through the openings 301 (refer to FIG. 3) in the 'C' shaped mounts. Once in position the snap-on fitting 131 and the end cap 132 are screwed onto the respective ends 150, 151 of the flow conduit 102 to retain the flow conduit 102 within the 'C' shaped mounts with the outwardly facing teeth 125 of flow conduit 102 engaging the inwardly facing teeth 112 of the 'C' shaped mounts 117. Rotational positioning of the flow conduit 102 relative to the platform 101 may be achieved by moving the flow conduit 102 longitudinally (i.e. axially) to disengage the inwardly facing teeth 112 of the 'C' shaped mounts 117 from the outwardly facing teeth 125 of the flow conduit 102. The outwardly facing teeth 125 of the flow conduit 102 will fully disengage from the inwardly facing teeth 112 of the 'C' shaped mounts 117 before the turret 122 reaches the inner edge of the shaped mounts 117, so that the 'C' shaped mounts do not impede the rotational adjustment. However such the longitudinal movement of the flow conduit 102 is only possible after either the end cap 132 or the snap on fitting 131 is removed as these fittings abut the 'C' shaped mounts 117 when screwed on to prevent longitudinal movement of the flow conduit 102 relative to the platform 101 in normal use conditions. When the required rotation of the flow conduit 102 has been made, it is slid in the opposite longitudinal direction to re-engaging the teeth 125 of the flow conduit 102 with the teeth 112 of the 'C' shaped mounts 117. Once the teeth the teeth 125 of the flow conduit 102 are re-engaged with the teeth 112 of the 'C' shaped mounts 117, the flow conduit may be restrained against axial movement by re-fitting the end cap 132 and/or the snap-on hose connector 131 to prevent further axial movement.

The central channel 110 and the skids 111 of the platform 101, occupy one plane so that lower surfaces of all three components sit evenly on flat ground when the sprinkler is in use. The two skids 111 are spaced at equal distances from the central channel 110 and have dimensions selected to allow the platform to sit within the valleys of commonly produced corrugated roof sheeting (lion, fibreglass etc.) or Custom Orb™ as it is sometimes called. With the lower surfaces sitting in the valleys of the corrugated material, the height of bridging parts 115 of the platform 101 are made sufficiently high to clear the peaks of the corrugated material. This configuration allows the sprinkler base 100 and sprinkler head 400 to be used on rooftops for cooling of building structures such as chicken sheds, bird, aviaries, workshops, houses, etc. Corrugated sheeting is commonly manufactured with the corrugations at a pitch of 76 mm and accordingly the skids 111 are preferably located at a spacing of in the order of 76 mm (e.g. in the range of 71-81 mm) from the central channel.

The platform 101 also includes two pre-moulded holes 114 so the sprinkler base can be secured to roofing iron ridges by roofing screws, enabling the sprinkler base to be installed on a sloping roof with the central channel 110 and the skids 111 running across the direction of the corrugations.

Roof pitch angles for houses and sheds are commonly designed at 22.5°, but are also known to vary in Australia from 5° to 25°. The co-operating teeth 112, 125 on the sprinkler base can effectively correct the orientation of the sprinkler head 400 to a near vertical position by using the corresponding rotational positions of 11.25°, 22.5°, 33.75° or 45°.

Figure 5:
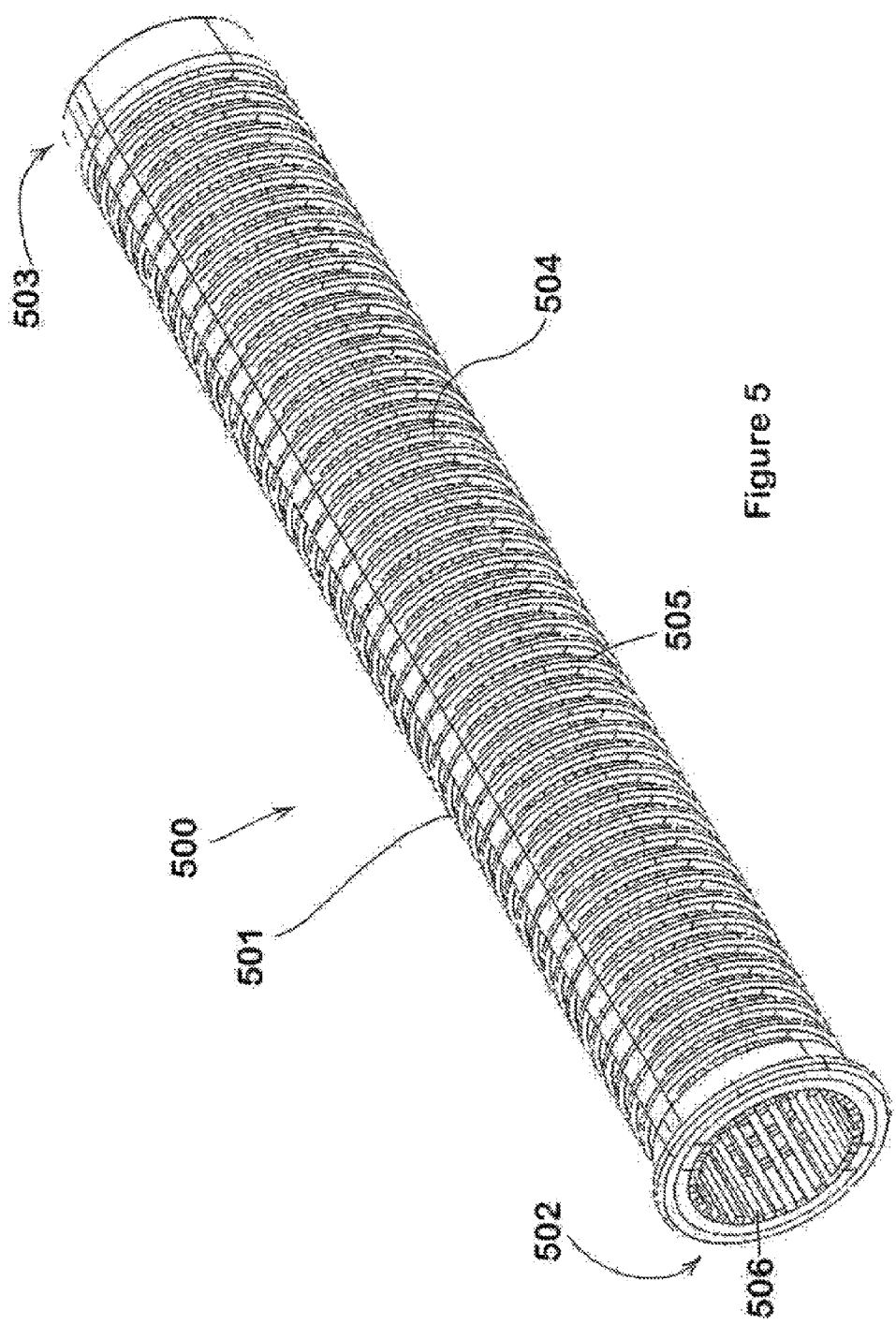
FIG. 5 is a flow through filter

The sprinkler base also incorporates a set of pressure regulating discs 140 (only one shown) which may be placed within the turret 122 under the sprinkler head when it is screwed into position. These disks comprise a plastic annulus 141 the opening 142 of which is used to control the flow rate and water distribution diameters of the sprinkler output. Four such pressure regulating discs 140 are provided, each with different sized opening 142 and these are stored in moulded recesses 113 in the platform 101. The different sized openings in the pressure regulating discs 140 provide differing amounts of pressure reduction to adjust for differing supply pressures and/or differing watering requirements Referring to FIG. 5, a flow through filter 500 is provided to prevent blockages in the pressure regulating disc and sprinkler head during operation. The filter 500 is inserted into the flow conduit 102 through one or other end 150, 151 of the flow through conduit 102 and seats against the snap-on hose fitting 131 and the end cap 132. Referring to FIG. 5, an inlet end 502 of the filter 500 preferably seals against the snap-on hose fitting 131 and an outlet end 503 of the filter preferably seals against the end cap 132, however if two snap-on hose fittings are fitted to the flow through conduit 102, then the outlet end 503 of the filter 500 will also seal against the second snap-on hose fitting. The filter 500 comprises a tubular filter screen 501 having a multitude of small screen apertures 504 defined between circumferential rings 505 and longitudinal ribs 506 of the tubular filter screen. By configuring the flow through filter 501 with a tubular filter screen 501 and open ends 502, 503 the free flow of water is allowed through the central passage of the tubular screen 501 onto the next sprinkler base when multiple sprinklers are used in a series. Only the water exiting through the turret 122 that will flow through the pressure regulating disc 141 and sprinkler head 400 passes through the screen apertures 504 of the flow through filter 500.

Multiple sprinkler bases can be connected and used in a series across an extended garden area, around roof edges and/or along the roof top ridge. By utilising the pressure regulating discs the pressure to be applied to each sprinkler base can be regulated to reduce variations in sprinkler throw. The occurrence of blockages can be reduced due to the inclusion of now through filters.

Flushing can be carried out by removing the termination end cap on the last base of the series and flushing the pipeline or hoses.

This sprinkler base described herein has multiple applications for irrigation, dust suppression and cooling. Components for this sprinkler base can be produced from plastics, metals or metal alloys etc. by moulding or casting.

The invention claimed is:

1. A sprinkler base comprising a platform component and a flow component, the flow component having a tubular body encompassing a flow passage, and a fluid inlet and a first fluid outlet communicating with each other via the flow passage, the first fluid outlet arranged to receive a sprinkler head extending perpendicularly to an axis of the tubular body, the platform component including mounting means comprising a pair of circumferential members engaging respective ends of the tubular body to hold the tubular body of the flow component, the circumferential members being 'C' shaped, and having a circumferential opening to permit the passage of the first outlet therethrough when the tubular body is inserted through the circumferential members to be engaged thereby, and the tubular body of the flow component and the platform component incorporating cooperating restraint surfaces comprising interengaging toothed surfaces to restrain the tubular body against rotation about the axis of the tubular body relative to the platform component in one of a plurality of incrementally spaced rotational positions.

2. The sprinkler base of claim 1 wherein teeth on the interengaging toothed surfaces are spaced at angles of 5-15° about the axis of the tubular body.

3. The sprinkler base of claim 1 wherein teeth on the interengaging toothed surfaces are spaced at angles of 11-12° about the axis of the tubular body.

4. The sprinkler base according to claim 1 wherein the tubular body has a second outlet in fluid communication with the inlet and the first outlet via the flow passage.

5. The sprinkler base of claim 4 wherein the inlet and second outlet are at opposite ends of the tubular body and the flow passage, the inlet and second outlet are co-axial.

6. The sprinkler base according to claim 4 wherein a filter is fitted into the flow passage, the filter having a screening surface separating the first outlet from the inlet and the second outlet, to screen fluid exiting through the first outlet while allowing fluid to exit the second outlet unscreened.

7. The sprinkler base according to claim 1 wherein a flow restriction device is provided to restrict an opening of the first outlet through which fluid flows.

8. The sprinkler base according to claim 1 wherein a bottom surface of the platform component has two or more elongate members connected by a raised bridge, the elongate members spaced to conform to valleys of corrugations in a corrugated sheet material and the bridge elevated from the elongate members to pass over ridges of the corrugated sheet material.

9. The sprinkler base of claim 8 wherein the bottom surface of the platform component has three elongate members.

10. The sprinkler base of claim 8 wherein the elongate members are spaced at centers which are 71-81 mm or a multiple thereof.

11. The sprinkler base according to claim 1 wherein the tubular body has a second outlet in fluid communication with the inlet and the first outlet via the flow passage.

12. The sprinkler base of claim 11 wherein the inlet and second outlet are at opposite ends of the tubular body and the flow passage, and the inlet and second outlet are co-axial.

13. The sprinkler base according to claim 12 wherein a filter is fitted into the flow passage, the filter having a screening surface separating the first outlet from the inlet and the second outlet, to screen fluid exiting through the first outlet while allowing fluid to exit the first outlet unscreened.

14. The sprinkler base according to claim 13 wherein a flow restriction device is provided to restrict an opening of the first outlet through which fluid flows.

15. The sprinkler base according to claim 14 wherein a bottom surface of the platform component has two or more elongate members connected by a raised bridge, the elongate members spaced to conform to valleys of corrugations in a corrugated sheet material and the bridge elevated from the elongate members to pass over ridges of the corrugated sheet material.

16. The sprinkler base of claim 15 wherein the bottom surface of the platform component has three elongate members.

* * * * *

UNITED STATES PATENT AND TRADEMARK OFFICE
CERTIFICATE OF CORRECTION

PATENT NO.        : 9,908,136 B2                                    Page 1 of 1
APPLICATION NO.   : 15/031499
DATED             : March 6, 2018
INVENTOR(S)       : Kathleen Patricia Holmes It is certified that error appears in the above-identified patent and that said Letters Patent is hereby corrected as shown below:

In the Specification

Column 1, Line 20: Delete "opiate" and replace with --operate--;

Column 1, Line 62: Delete "suit ace" and replace with --surface--;

Column 3, Line 6: Delete "a least" and replace with --at least--;

Column 3, Line 48: Delete "the shaped" and replace with --the 'C' shaped--;

Column 3, Line 50: Delete "However" and replace with --However,--;

Column 3, Line 59: Delete the second occurrence of "the teeth";

Column 4, Line 4: Delete "lion" and replace with --iron--;

Column 4, Line 11: Delete "bird, aviaries" and replace with --bird aviaries--;

Column 4, Line 41: Delete "requirements" and replace with --requirements.--; and Column 5, Line 4: Delete "now" and replace with --flow--.

Signed and Sealed this
Twelfth Day of November, 2019

Andrei Iancu
*Director of the United States Patent and Trademark Office*